United States Patent Office 3,006,435
Patented Oct. 31, 1961

3,006,435
LIQUID ENTRAINMENT SEPARATOR
William J. Alton, Cleveland, Lawrence M. Deeks, Westlake, Thomas J. O'Donnell, Cleveland, and Samuel H. S. Raub, Bay Village, Ohio, assignors to Union Carbide Corporation, a corporation of New York
Filed Jan. 29, 1958, Ser. No. 711,846
4 Claims. (Cl. 183—2)

This invention relates to a method and apparatus for separating entrained liquid from a gas stream, and more particularly to separating an acid solution from an acid gas.

Heretofore, processes of absorption of gases into liquids to make solutions have been limited production wise, by entrainment of absorbed product in the exhaust gas, to operation at low throughput rates.

It is therefore an object of this invention to provide apparatus for separating liquid entrained in exhaust gas. It is another object of this invention to provide apparatus for separating enrtained acid solution from exhaust gas which apparatus is inert to the corrosive action of the acid. Such apparatus is referred to herein as an "entrainment separator."

The invention comprises the incorporation of a chemically inert, substantially conical member in an absorption column above the exit port of the solution product, which member effects separation of entrained liquid from exhaust gas.

Figure 1:
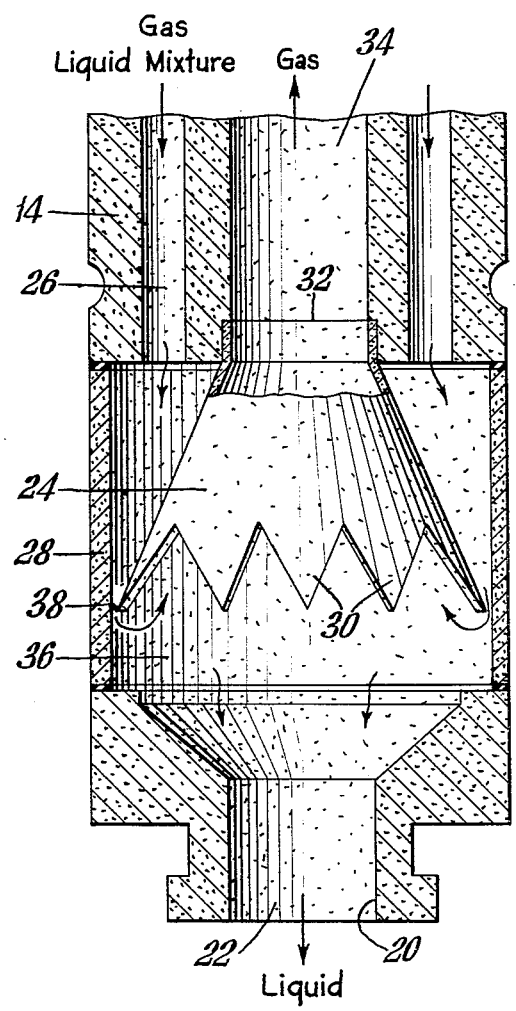
FIG. 1 is an elevation partly in section of one form of an entrainment separator adapted to use in this invention installed in an absorption column, part of the column being broken away.

The mode of operation of this invention may be best described by reference to the absorption of hydrogen chloride gas in water to form hydrochloric acid. Referring to FIG. 1 of the drawings, water is fed into the top of a standard absorption column 14. Hydrogen chloride gas enters under pressure and passes concurrently with water, which has absorbed some hydrogen chloride, down the column 14. During this concurrent passage, more gas is absorbed in the water until the remaining gas and the hydrochloric acid thus formed pass to the strong acid exit port 20 where the hydrochloric acid runs off as product.

The gas and acid pass out of the confined tube sheet 26 to an area of decreased pressure 36, which area houses the conical member 24. The acid runs down the sides 28 and out the exit port 20 while the gas envelops the conical member 24 which acts as a surface upon which the gas will give up its entrained acid. The resulting gas passes around the conical member 24 and entrained hydrochloric acid separates therefrom. The conical member 24 has teeth 30 along the maximum diameter edge thereof and is truncated 32 on the other edge in such a manner that the truncated edge 32 fits into the central shaft 34 of the absorption column 14 wherein the separated gas passes up the column 14 to be absorbed by water entering the column 14.

A small marginal space 38 is provided between the maximum diameter of the teeth 30, of the conical member 24, and the side wall 28 in order to allow the liquid to form bridges between the teeth 30 and the side wall 28.

The teeth 30 act to channel and direct the flow of separated acid 22 through the bridges to the side wall 28 and then on to the exit port 20. The acid rich gas flowing out of the tube sheet 26 then may pass between the teeth 30, giving up its entrained acid in the manner above described, without enveloping droplets of separated acid and re-entraining them.

Figure 2:
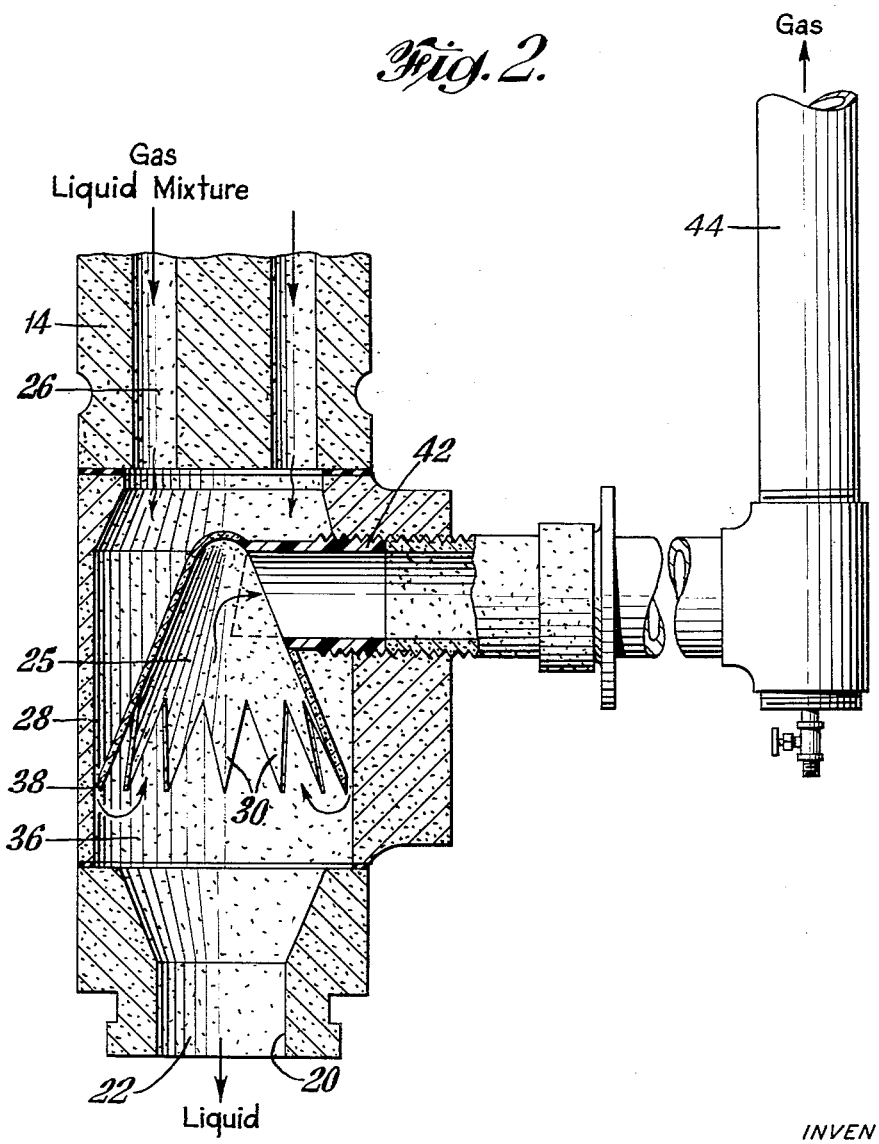
FIG. 2 is similar to FIG. 1, showing a modified entrainment separator.

Another modification of the invention herein disclosed is shown in FIG. 2 wherein unabsorbed gas containing entrained liquid and liquid containing absorbed gas (aqueous acid) flow out of a tube sheet 26 into a region of reduced pressure 36. The acid flows down the side walls 28, and out the exit port 20, while the gas flows around the conical member 25. A sleeve 42 is joined to the side of the conical member 25 which removes the separated gas from the system. The end of this sleeve 42 is preferably beveled with the face of the bevel turned toward the top of the cone. The entrained acid which is deposited upon the conical member 25 is guided into streams by the teeth 30 along the larger diameter edge thereof and flows out the exit port 20 as product.

The gas which is now substantially free of entrained liquid passes up the pipe 44 and re-enters the column 14 above the initial gas feed point where it is absorbed by the feed water. Thus, the feed water absorbs weak acid gas to make a weak acid solution and then absorbs rich feed gas to make the acid product.

As an example of an entrainment separator which is in accord with this invention, a cone having a 4¾ inch outside diameter and a wall thickness of 5/32 inch was truncated, at a height of 3 9/32 inches from the base, to a diameter of 2 inches. Teeth in the form of 12 V grooves each 1⅛ inches high were cut into the base and the truncated cone was then fitted with a small cylindrical member rising from the truncated diameter and attached to the central shaft of the column. A cylindrical containing shell was then fitted into place so as to envelop the conical member.

The entrainment separator and containing shell were installed in a conventional absorption column, and tests were made upon the column with and without an entrainment separator. Since, in this particular case, the column was for the absorption of hydrogen chloride gas in water to produce hydrochloric acid, the entire column as well as the separator was made of impervious graphite.

Figure 3:
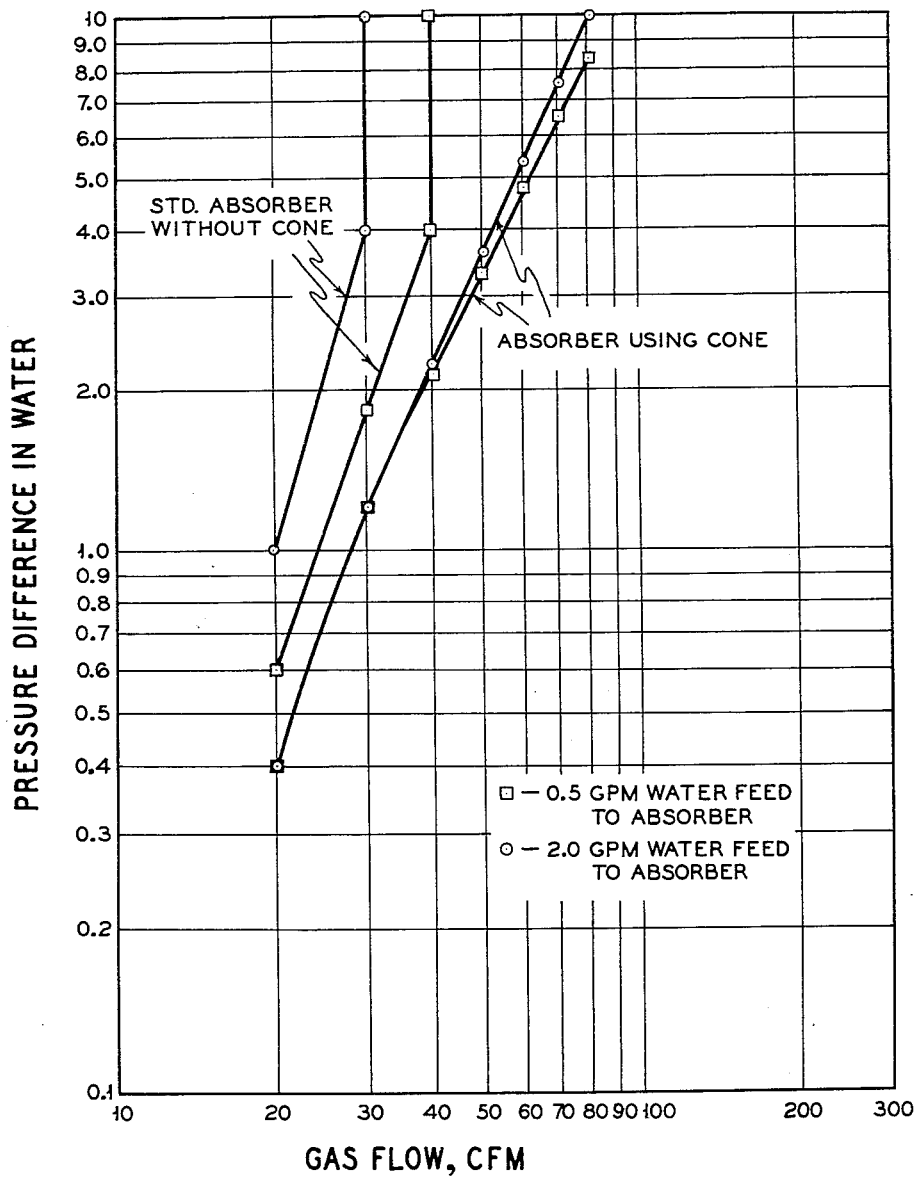
FIG. 3 is a graphical representation of the data obtained by operation of an absorption column with and without an entrainment separator as shown in FIG. 1.

FIG. 3 shows two sets of curves which represent tests made on equipment similar to FIG. 1, wherein different water feed rates were employed. The gas flow in the absorber tubes was plotted against the gas flow resistance as represented by the pressure drop between the gas inlet port and the upper end of the central shaft. It may readily be seen by reference to FIG. 3 that the incorporation of an entrainment separator made in accordance with this invention greatly decreases the pressure difference (resistance to flow) for the same gas flow rate. It is also pointed out that without the benefit of an entrainment separator, a maximum gas flow would be reached beyond which the water leg seals, at the top of the absorber, would blow and gas would almost entirely bypass the absorber. In the tests made on equipment containing a separator, no such maximum value was reached. It is also to be observed that without the benfit of the entrainment separator, a wide variation of pressure difference exists for various water feed rates. However, the entrainment separator gives negligible variance in pressure for different water feed rates. This would tend to show that the production capacity of this operation could be greatly increased without regard to feed rates.

Figure 4:
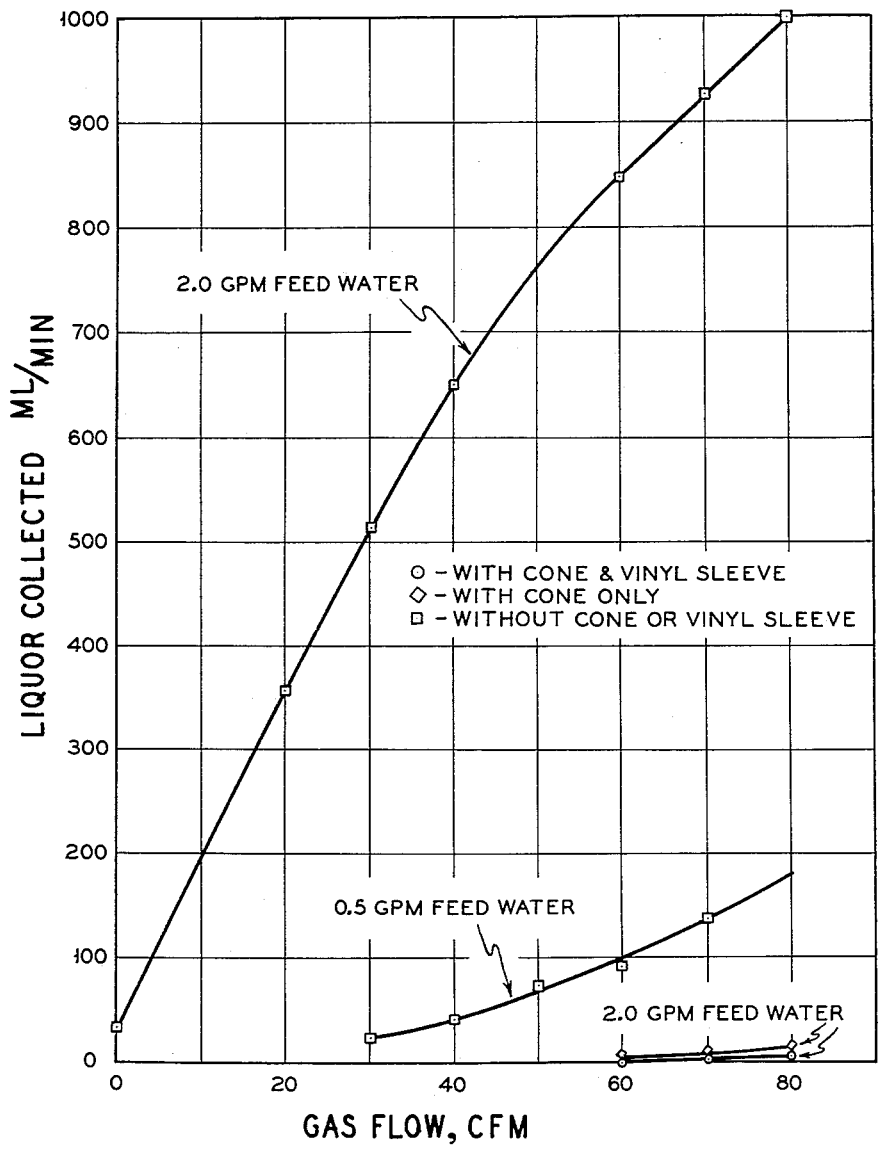
FIG. 4 is a graphical representation of the data obtained by operation of an absorption column with and without entrainment separators as shown in FIGS. 1 and 2.

FIG. 4 shows the results of tests made on equipment similar to that shown in FIG. 2 and FIG. 1. The equipment of FIG. 2 was modified so as to allow the gas which passed out of the cone to be completely stripped of its entrained liquid. The data that was taken recorded the amount of entrained liquid which the gas gave up with and without the use of the entrainment separator. The amount of liquid collected was then plotted against the rate of gas flow to give the curves of FIG. 4. Four runs were made, three of which utilized a 2 gallon per minute water feed rate, the fourth being run at ½ gallon per minute water feed rate. Of the three runs made at 2 g.p.m., one was on standard equipment, one on equipment modified by the addition of a cone as in FIG. 1, and one on equipment modified by the addition of a cone and sleeve as in FIG. 2.

These curves show that the use of an entrainment separator greatly decreased the amount of entrained liquid carried away from the exit port by the gas. It is to be noted that the amount of liquid left entrained in the gas leaving the equipment modified by the incorporation of an entrainment separator at a throughput of 2 g.p.m. was even less than the amount of liquid left entrained in the gas leaving the unmodified equipment at a throughput of only ½ g.p.m. There was further difference between the quantity of liquid left entrained in the gas leaving equipment modified with a cone and the quantity of liquid left entrained in the gas leaving the equipment modified with a cone and sleeve. The beveled-end, side-outlet sleeve as described above reduced the remaining liquid content of the gas to about half that of the system with the cone alone.

The tests run and the data recorded show conclusively that the incorporation of an entrainment separator, made in accordance with this invention, remarkably increases the output of an absorption column.

While this invention has been particularly described with relation to a system for absorbing hydrogen chloride in water to make hydrochloric acid, it is by no means limited to use in such a system but is adapted to use in any system wherein a liquid product is to be separated from a gaseous carrier or wherein a liquid is to be separated from a gaseous product, as for example the solution of sulfur trioxide in water to form sulfuric acid or nitric oxide in water to form nitric acid.

What is claimed is:

1. In a gas absorption column, wherein a gas is absorbed into a liquid to make a solution product and wherein at least some of said solution product becomes entrained in unabsorbed gas, which column comprises a multiplicity of substantially parallel tubes wherein some of said gas dissolves in said liquid and some of said solution becomes entrained in said gas; a shaft substantially parallel to said tubes through which unabsorbed gas is removed from said column; and an exit port through which solution product is withdrawn from said column; the improvement comprising providing an extension near the bottom of said column between the lower end of said tubes and said exit port; and further providing a substantially conical member within said extension having serrations along the edge thereof adjacent said extension and communicating with said shaft, said tubes being substantially normal to the projected area of said conical member and being so disposed as to be spaced substantially uniformly over the entire surface area of said conical member, said member and said column extension being adapted to receive said unabsorbed gas having solution product entrained therein and to separate said entrained solution from said unabsorbed gas, said separated solution product passing along said serrations onto said extension and thence on to said exit port, said separated unabsorbed gas passing between said serrations through said conical member to said shaft and thence out of said column.

2. The improvement described in claim 1 wherein said tubes are disposed around said shaft which is substantially centrally located in said column and wherein said conical member is truncated, said truncated portion communicating with said shaft.

3. The improvement described in claim 1 wherein said shaft is external to said column and communicates with said conical member by means of a sleeve extending from the side of said conical member which passes through said extension.

4. The improvement described in claim 3 wherein said sleeve is provided with a bevel thereon extending into said conical member, said bevel pointing substantially toward the vertex of said conical member.

References Cited in the file of this patent

UNITED STATES PATENTS

| | | |
|---|---|---|
| 1,147,463 | Ulrici | July 20, 1915 |
| 1,269,134 | Trumble | June 11, 1918 |
| 1,813,637 | Powers | July 7, 1931 |
| 2,661,812 | Gilmore | Dec. 8, 1953 |
| 2,744,730 | Merritt | May 8, 1956 |

FOREIGN PATENTS

| | | |
|---|---|---|
| 28,406 | Great Britain | 1904 |